United States Patent [19]
Lehrman

[11] Patent Number: 5,979,725
[45] Date of Patent: Nov. 9, 1999

[54] MULTI-COMPARTMENT ORGANIZER FOR MINIVAN

[76] Inventor: Mark A. Lehrman, 7623 Dunleer Way, Dallas, Tex. 75248

[21] Appl. No.: 09/008,018

[22] Filed: Jan. 16, 1998

[51] Int. Cl.$^6$ ............................................. B60R 7/00
[52] U.S. Cl. .................. 224/539; 220/23.87; 220/23.88; 224/925
[58] Field of Search .................... 224/404, 539, 224/542, 925; 296/37.6, 37.8; 220/23.87, 23.88

[56] References Cited

U.S. PATENT DOCUMENTS

| | | | |
|---|---|---|---|
| 4,029,244 | 6/1977 | Roberts | 224/42 |
| 4,303,367 | 12/1981 | Bott | 414/522 |
| 4,538,737 | 9/1985 | Delaney | 224/925 |
| 4,573,731 | 3/1986 | Knaack et al. | 296/376 |
| 5,094,375 | 3/1992 | Wright | 224/42 |
| 5,129,612 | 7/1992 | Beaupre | 248/166 |
| 5,249,724 | 10/1993 | Green | 224/275 |
| 5,441,183 | 8/1995 | Frenzel | 224/542 |
| 5,484,091 | 1/1996 | Malinowski | 224/542 |
| 5,492,257 | 2/1996 | Demick | 224/275 |
| 5,501,384 | 3/1996 | Wisniewski | 224/539 |
| 5,526,972 | 6/1996 | Frazier et al. | 224/539 |
| 5,568,890 | 10/1996 | Magee et al. | 224/539 |
| 5,597,193 | 1/1997 | Conner | 224/404 |
| 5,601,271 | 2/1997 | Janowski | 248/503 |
| 5,603,439 | 2/1997 | Pineda | 224/403 |
| 5,628,442 | 5/1997 | Wayne | 224/543 |

*Primary Examiner*—Stephen P. Garbe
*Attorney, Agent, or Firm*—Dennis T. Griggs

[57] ABSTRACT

A multi-compartment organizer and storage enclosure includes a foldable partition assembly in which first and second divider panels are movably coupled together for folding and unfolding movement. The foldable partition assembly can be folded flat and placed in a first position resting across the top panel of the enclosure, and can be erected to an upright standing position relative to the enclosure. The divider panels are further movable to an unfolded position, thereby defining an upright corner frame for opposing shifting movement of a load carried on the top panel. A removable insulated container with retractable carry handles is mounted in a central compartment of the storage unit. A pull-out panel is slidably coupled beneath the storage unit and adjustable positioning arms are extendable for installation of the storage enclosure within the rear deck space of a minivan.

18 Claims, 5 Drawing Sheets

MULTI-COMPARTMENT ORGANIZER FOR MINIVAN

BACKGROUND OF THE INVENTION

This invention relates generally to a multi-compartment storage enclosure for installation behind the rear seat in the rear deck space of a station wagon, minivan or sport utility vehicle.

Storage space in sport utility vehicles, minivans and station wagons is usually limited to rear seat placement or rear deck placement. There is little or no enclosed space or trunk space available for temporary storage of packages or organizing small items such as sports equipment, picnic items and the like. Similarly, there is little or no space for permanent storage of emergency items, such as road flares, jumper cables, tools and the like. The rear seat of a station wagon, for instance, generally folds over to expand the rear deck space. Minivans and sport utility vehicles have rear doors that are vertically hinged on opposite sides and swing outwardly to provide access to a small rear deck space. Alternatively, they may have horizontally hinged doors that swing upward to open. When articles are placed in the open on the rear deck space, they are vulnerable to theft as the articles are in plain view through the windows. Additionally, unless the stored articles are packed tightly, they will shift during transit, possibly causing damage and may become scattered or overturned.

Various storage enclosures have been proposed for organizing rear spaces within minivans, sport utility vehicles, station wagons and the like. One common organizing technique is to provide vertical partitions to keep articles from moving about. For example, U.S. Pat. No. 5,603,439 shows a truck cargo organizer, consisting of adjustable partitions that are open at the top and bottom. The purpose of that organizer is to provide adjustable areas within the truck bed to separate a load into smaller portions to keep the load from shifting during travel. The load is visible and the organizer provides no security for the load.

Another common solution is to provide a storage enclosure with pull-out drawers. U.S. Pat. No. 4,563,731 is a storage unit using locking drawers to store and organize items, usually tools, on a truck bed. The top of the unit substitutes for the floor of the truck bed and access to the drawers is through the open tail gate of the truck. The construction of that storage unit is intended for heavy tools and construction equipment.

U.S. Pat. No. 5,492,257 discloses a rear seat-mounted organizer for van-type vehicles. The organizer is attached to the back of the rear seat in a minivan and folds against the seat when not in use. That organizer uses an extendable tubular frame for limiting horizontal movement of paper shopping bags during transit.

BRIEF SUMMARY OF THE INVENTION

The present invention provides a portable storage enclosure for use behind the rear seat of a sport utility vehicle, minivan or station wagon. The storage enclosure is configured as a multi-compartment organizer, with hinged panels for supporting bags and drawers for securing small items. The storage enclosure further includes an insulated, removable container and an extendable support panel. The storage unit is intended for installation in sport utility-type vehicles, and is adaptable for use in vehicles of various sizes by laterally and vertically adjustable positioning arms.

Located on top and on opposite ends of the multi-compartment organizer are dual hinged panels. Each dual panel assembly is arranged with a first panel slidably coupled to hinges attached to the top of the organizer and adjacent to a set-up locator slot. A second panel is movably coupled by a hinge to the first panel along one side. As the first panel is pivoted to an upright working position, it slides into the set-up locator slot, thus providing a vertical partition wall. The other panel swings out and locks into place at a right angle to the first panel. Together the two panels form a stable, upright corner support for securing shopping bags and the like.

Centered between the dual hinged panels on the top of the organizer and disposed within a central compartment is a removable, thermally insulated container. The insulated container fits flush with the top of the multi-compartment organizer and is covered by a hinged top. The hinged top includes a detachable insulated lid that provides a portable cover for the insulated container when the container is removed from the storage unit. With the insulated container removed, the central compartment can also be used for storage of small items.

Slidably coupled to the underside of the storage enclosure is a pull-out panel that functions as a service table or work table when extended. The pull-out panel is guided by two opposed support members that permit horizontal extension and retraction of the panel. As the pull-out panel fully extends, a spring-loaded boss slips into an opening near the end of one of the support members, preventing over-extension of the panel.

On either side and attached to the base panel of the storage enclosure are adjustable side and base positioning arms that provide for stable installation in virtually any vehicle having vertical side walls and a floor or deck. The base positioning arms are adjustable for leveling the multi-compartment organizer, and also for elevating the organizer to provide a storage space between the organizer and floor for oversized flat items.

The storage enclosure of the present invention also includes two pull-out drawers that have removable organizing partitions in place within the drawers. The drawers are positioned on opposite sides of the multi-compartment organizer. This feature provides concealment and storage space for small items such as utensils, small packaged items, canned items and the like, as well as tools and emergency equipment. When the rear doors or tailgate of the vehicle is closed, the drawers are blocked in the closed position.

The multi-compartment organizer and storage enclosure of the present invention provides convenient storage space for small items, shopping bag restraint, a removable insulated container, a pull-out work panel and pull-out drawers for small item storage and organization. Moreover, the storage enclosure can be installed and removed without special tools. Recesses are provided on each side panel to facilitate lifting and moving of the organizer.

BRIEF DESCRIPTION OF THE DRAWING

The accompanying drawing is incorporated into and forms a part of the specification to illustrate the preferred embodiments of the present invention. Throughout the drawing, like reference numerals designate corresponding elements. The drawing, together with the description, explains the principles of the invention and illustrates an exemplary embodiment showing how the invention can best be made and used. The drawing should not be construed as limiting the invention to the illustrated and described embodiment. Various advantages and features of the invention will be understood from the following detailed description taken in connection with the appended claims and with reference to the attached drawing in which:

FIG. 8 is a perspective view of the multi-compartment organizer with an internal cold storage chest removed;

FIG. 9 is a perspective view, partially in section, of the multi-compartment organizer with the insulated cold storage chest open and internal cover removed; and, FIG. 10 is a perspective view of the insulated cold storage chest with insulated cover closed and carry handles extended.

DETAILED DESCRIPTION OF THE INVENTION

In the description which follows, like parts are marked throughout the specification and drawing with the same reference numerals, respectively. The drawing figures are not necessarily to scale in the interest of clarity.

Figure 1:
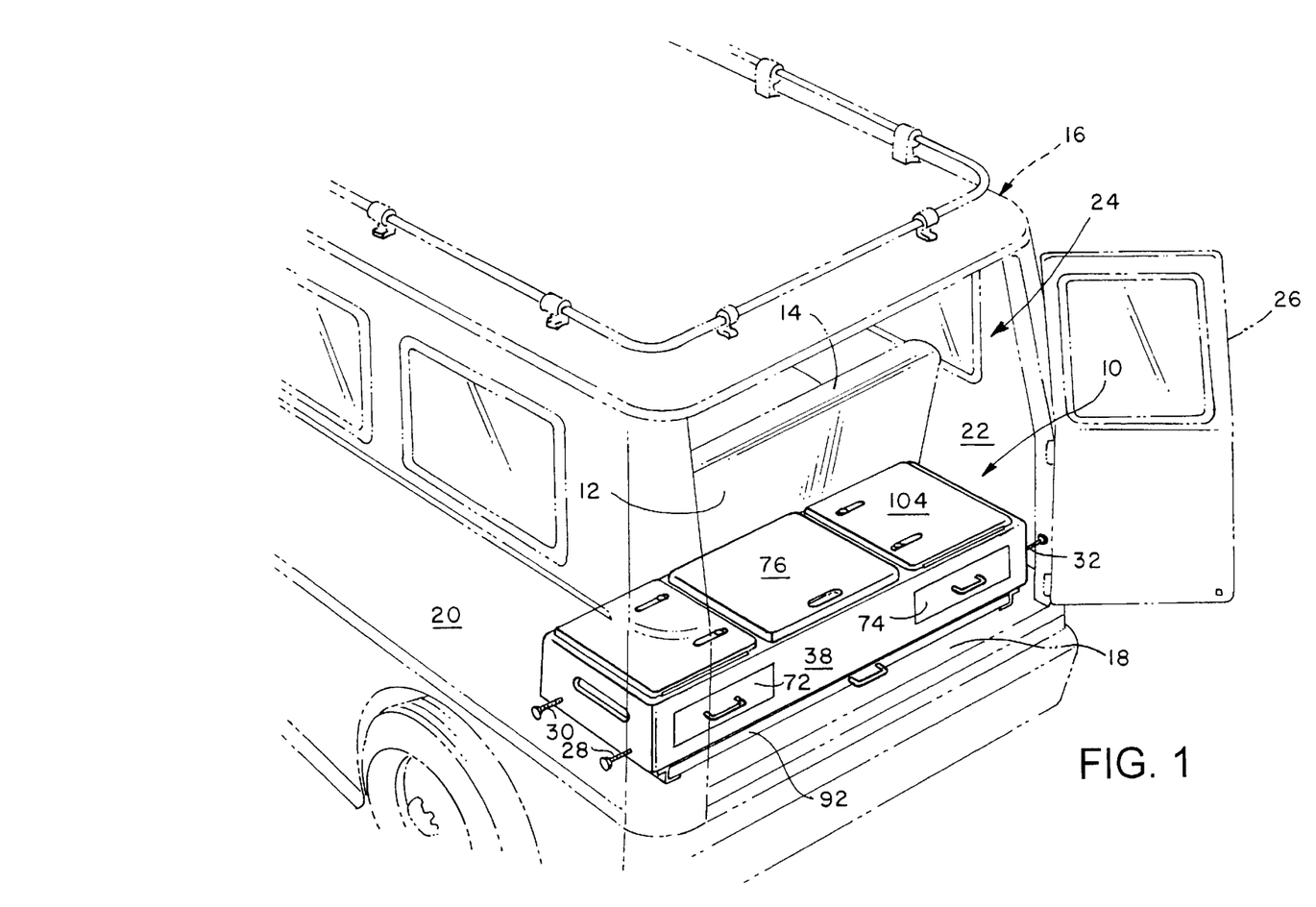
FIG. 1 is a perspective view of the multi-compartment organizer and storage enclosure of the present invention installed on the rear deck of a minivan.
Figure 2:
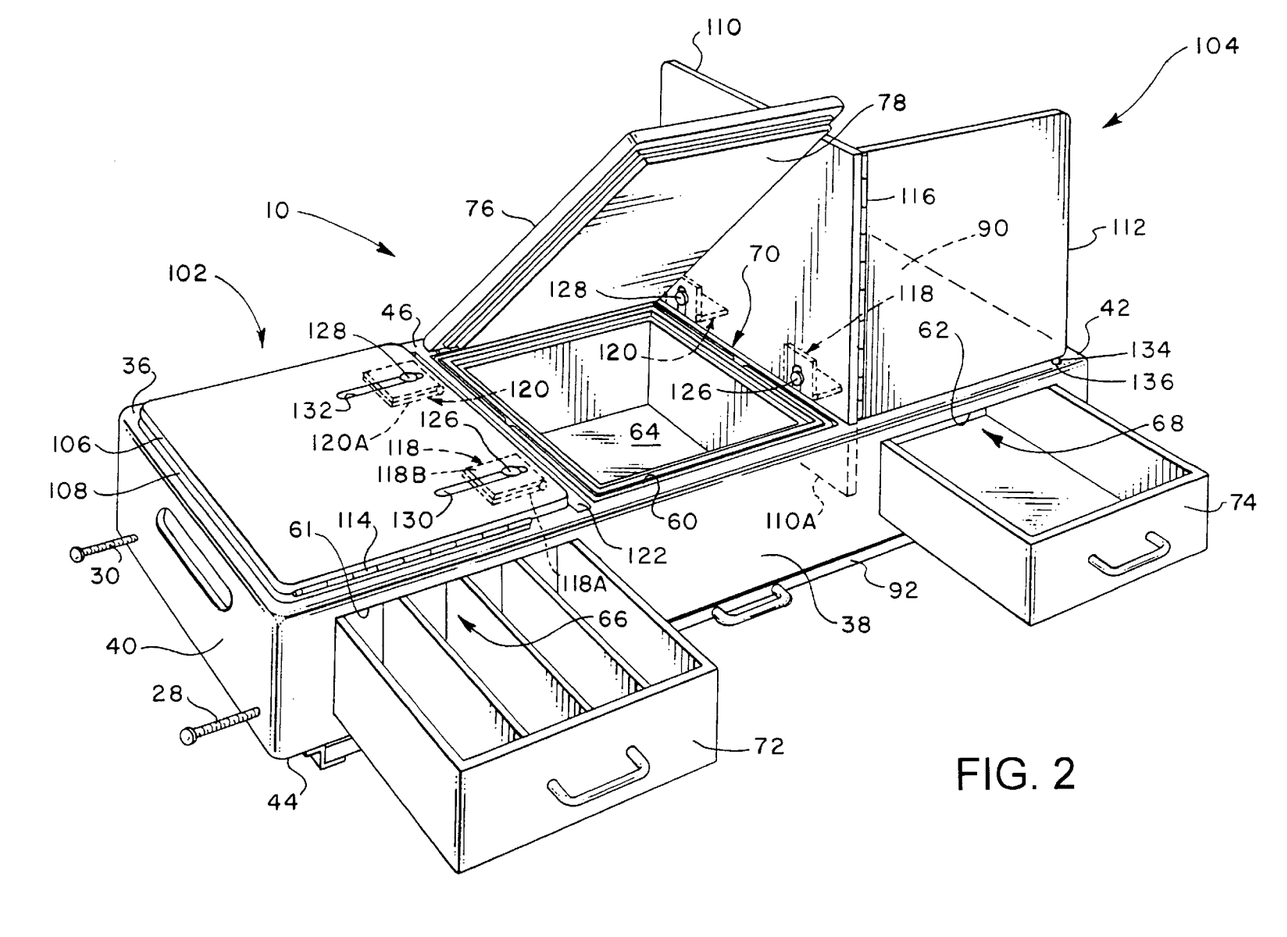
FIG. 2 is a perspective view thereof showing the preferred arrangement of drawers, hinged panels and central compartment.

Referring to FIGS. 1 and 2, a portable storage enclosure 10, configured as a multi-compartment organizer, is installed in an operative position within the rear deck space 12 behind the rear seat 14 of a motor vehicle 16, such as a sport utility vehicle, station wagon or minivan as shown in FIG. 1. The motor vehicle 16 includes a load bed formed by a load deck 18 and laterally opposed deck sidewalls 20, 22 which frame a rear access opening 24. A pair of hinged doors 26 are coupled to the left and right deck sidewalls for opening and closing the access opening 24. The deck sidewalls are recessed from the inner side edges of the access opening 24 so that the transverse width of the load bed is typically greater than the distance between the framing portions of the rear door access opening 24.

The multi-compartment organizer and storage enclosure 10 of the present invention provides convenient internal storage for several small items as well as external support for large items such as shopping bags, sports equipment, picnic supplies and the like. Moreover, the storage enclosure is adapted for use as an organizer for small parts and hand tools.

The storage enclosure 10 includes a generally horizontally extending top panel 36 which has a width less than the spacing between the load deck sidewalls so that the storage enclosure can be installed by one person through the rear deck access opening 24. The storage enclosure 10 also includes a forward panel 38 which extends substantially normal to the top panel 36. The storage enclosure 10 further includes a left side panel 40, a right side panel 42, a base panel 44 and a rear panel 46.

The multi-compartment organizer and storage enclosure 10 is adapted for use in the rear load deck space of vehicles of various sizes, and is intended for placement behind the rear seat on or elevated above the floor or load deck of the motor vehicle. The storage enclosure 10 is stabilized in the operative position (FIG. 1 and FIG. 5) within the load deck space 12 by adjustable side positioning arms 28, 30, 32 and 34.

Each positioning arm is coupled by a threaded union with one of the first and second side panels and is adjustable for engaging the load deck sidewalls 20, 22 when the storage enclosure 10 is positioned within the rear deck space 12 as shown in FIG. 1. The projection of each side positioning arm relative to the storage enclosure 10 is adjusted for contacting engagement against the load deck sidewalls, thus establishing a compression union which anchors the storage enclosure within the rear deck space 12 and centers the storage enclosure 10 between the left and right deck sidewalls 20, 22. A similar arrangement is provided on the underside of the base panel 44, including adjustable base positioning arms 48, 50, 52 and 54. The base positioning arms are adjustable for leveling the storage enclosure 10, and also for elevating the storage enclosure to provide a narrow storage space 56 between the base panel 44 of the storage enclosure and the load deck 18 for oversized flat items.

Figure 7:
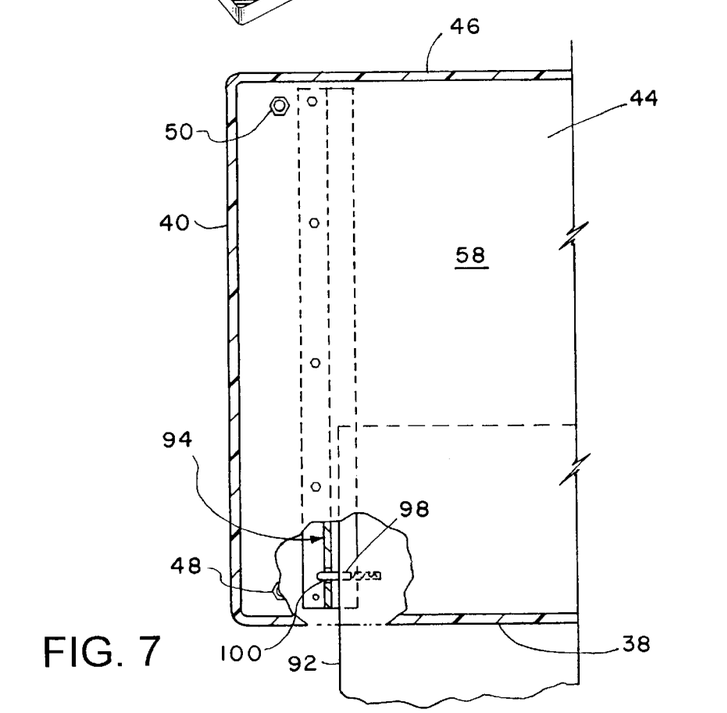
FIG. 7 is a sectional view, taken along the line 7—7 of FIG. 5, of a spring-loaded boss engaged with support member

Referring now to FIG. 2, FIG. 3, FIG. 4 and FIG. 5, the top panel 36, front panel 38, left side panel 40, right side panel 42, base panel 44 and rear panel 46 are interconnected to form sidewall boundaries of a main storage compartment 58 (FIG. 7). Access to the main storage compartment 58 is provided by a central access opening 60 which intersects the top panel 36 in the form of a rectangular window opening. Access through the front panel 38 is provided by rectangular front access openings 61, 62 which intersect the front panel 38 adjacent opposite ends of the storage enclosure. According to this arrangement, a central storage compartment 64 is established within the main storage compartment 58 in alignment with the central access opening 60. Likewise, left and right front access storage compartments 66, 68 are formed on laterally opposite sides of the central storage compartment 64.

According to one aspect of the present invention, a portable storage container 70 is removably mounted within the central storage compartment 64, and first and second pull drawers 72, 74 are slidably received within the left and right front access storage compartments 66, 68, respectively. The foregoing symmetrical arrangement provides quick access to all internal compartments while simultaneously providing left and right top load support panel portions 88, 90 on laterally opposite sides of the central compartment.

Figure 3:
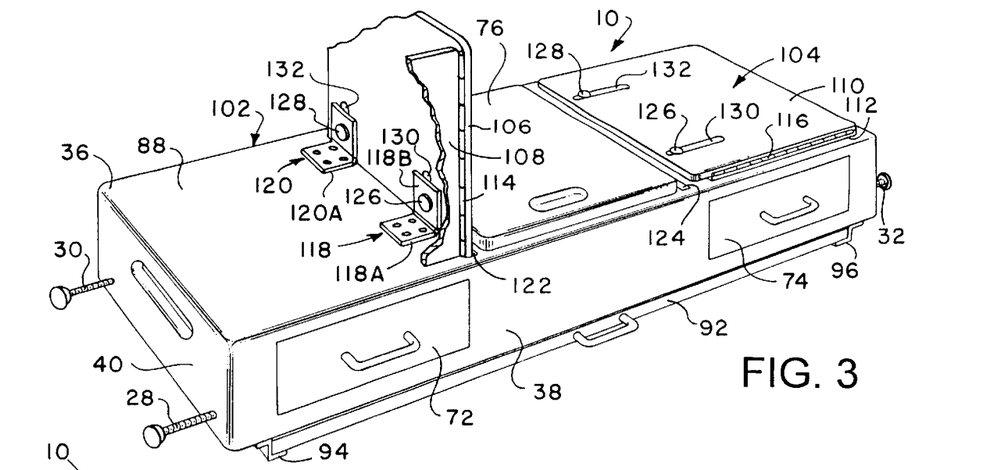
FIG. 3 is a perspective view thereof showing all compartments closed.
Figure 4:
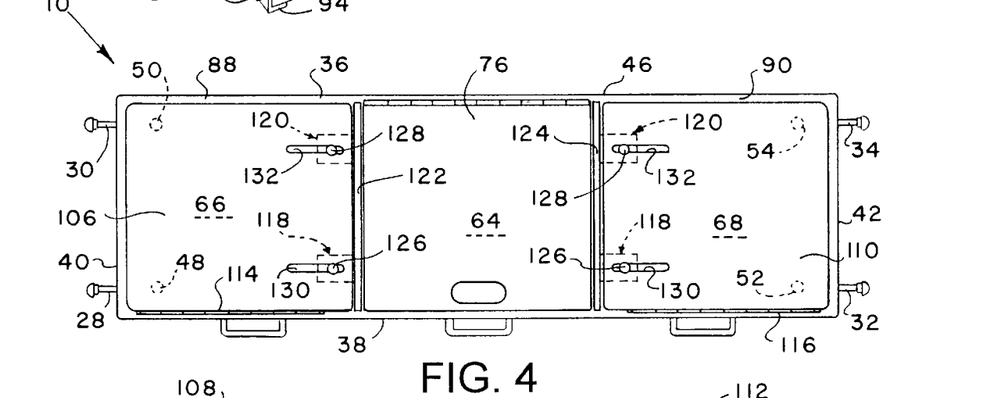
FIG. 4 is a top plan view thereof.

A closure lid 76 is pivotally coupled to the top panel 36 for movement from an extended position (FIG. 2) in which the central access opening 60 is uncovered and the central storage compartment 64 is exposed, to a fully retracted position (FIG. 3) in which the central access opening is covered. Moreover, with the main closure lid 76 in the fully retracted position as shown in FIG. 1 and FIG. 3, the entire top panel area is available for receiving oversized articles, for example golf clubs, fishing rods and camping equipment.

Referring now to FIG. 2, FIG. 8, FIG. 9 and FIG. 10, the auxiliary lid 78 is releasably coupled to the main closure lid 76 by complementary Velcro fastener strips 80, 82 attached to the underside of the main closure lid 76, and complementary Velcro fastener strips 84, 86 attached on the top side of the auxiliary lid 78. According to this arrangement, the auxiliary closure lid can be removed from the main closure lid for use on the portable storage container 70 when it is removed from the central storage compartment 64.

Figures 8, 9, 10:
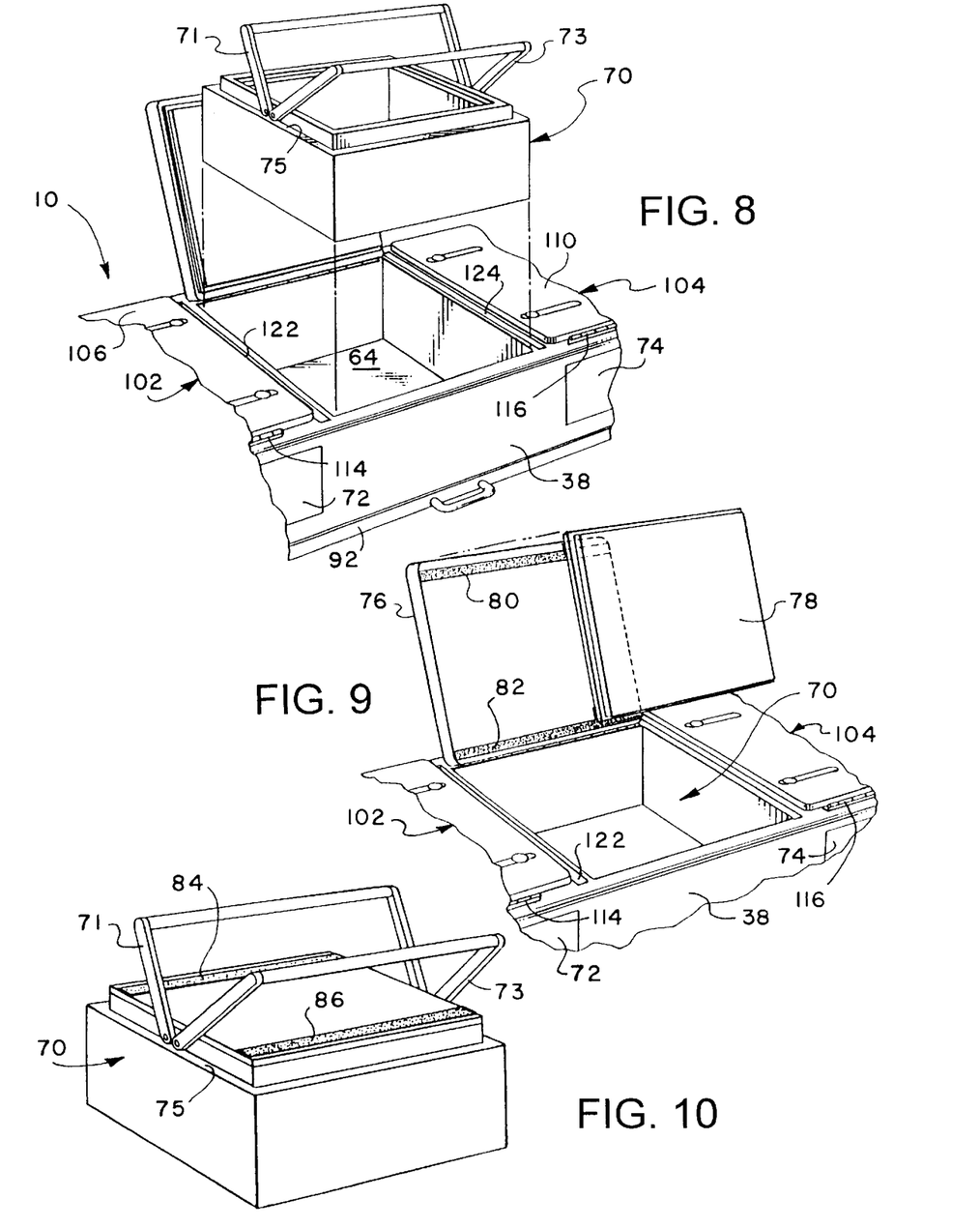

The portable storage container 70 is dimensioned appropriately for nesting engagement within the central storage compartment 64. A pair of carry handles 71, 73 are pivotally coupled along a radially inset shoulder portion 75 of the portable storage container. According to this arrangement, the handles are movable to a fully retracted position in which they lie flush with the top opening of the portable container, and can be extended upwardly so that the portable container 70 can be lifted vertically out of the main storage container 64, as indicated in FIG. 8.

In the preferred embodiment, the portable storage container is constructed as a water-tight assembly of thermally insulated panels, thereby forming a cold storage compartment. In that configuration, the portable storage container can be used to carry ice, beverages and perishable food items that should be refrigerated.

The storage enclosure 10 is preferably fabricated of a suitable engineering material such as sheet steel or aluminum, or reinforced plastic, for example. Cabinet grade wood paneling may be employed, if desired. The fabrication of the storage enclosure is preferably in accordance with conventional manufacturing processes, including molding of plastic materials. Light-weight, high strength plastic construction is preferred, so that the storage enclosure 10 can be easily lifted, handled and set-up by one person.

Figure 6:
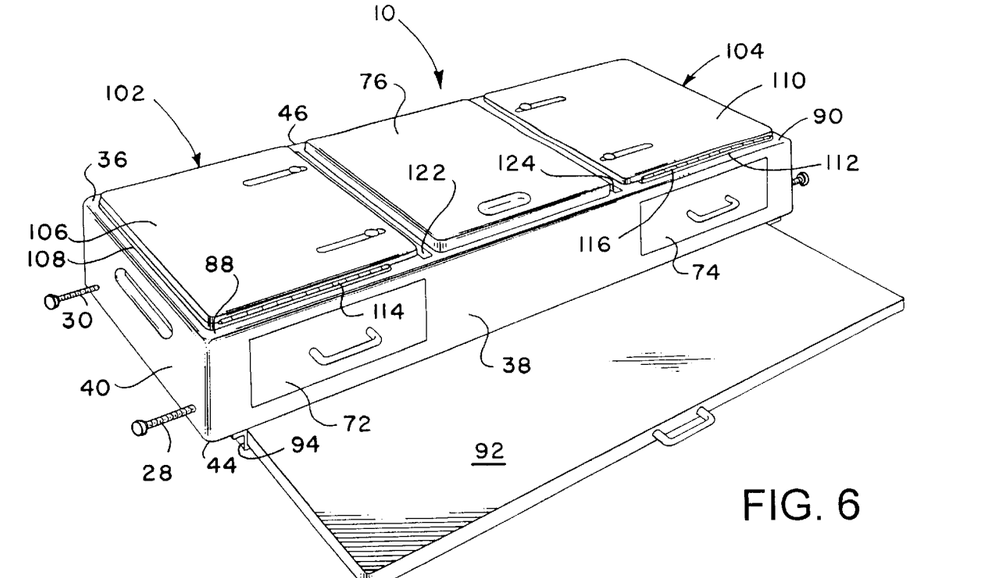
FIG. 6 is a perspective view of the multi-compartment organizer and storage enclosure with the service table panel extended.

Referring now to FIG. 6 and FIG. 7, a utility panel 92 is slidably coupled to the underside of the base panel 44 for movement from a storage position (FIG. 3) in which the utility panel is fully retracted beneath the base panel, to a pull-out service position (FIG. 6) in which the utility panel extends outwardly from the storage enclosure, thereby providing a service table or work surface directly in front of and below the pull-drawers 72, 74 and central storage container 70. The utility panel 92 is guided and supported along laterally opposite sides by channel guide members 94, 96, respectively. Extension of the utility panel 92 is limited by latching engagement of a spring-loaded boss 98 which slips into a latch recess 100 (FIG. 7) as the utility panel approaches full extension, thus preventing over-extension of the panel.

On many occasions, it is desirable to segregate and minimize shifting movement of various loose items contained within grocery bags, shopping bags and the like, which tend to overturn during transportation, thus allowing the contents to spill or scatter. According to one aspect of the present invention, support against lateral shifting movement of relatively loose articles is provided on top of the storage enclosure on laterally opposite sides of the main storage compartment by first and second foldable partition assemblies 102, 104. Each foldable partition assembly includes first and second divider panels 106, 108 and 110, 112, respectively. The first and second divider panels 106, 108 are coupled together by a piano hinge 114 for folding and unfolding movement with respect to each other. Likewise, the divider panels 110, 112 are coupled together by a piano hinge 116 for folding and unfolding movement.

The divider panels 106, 110 of each partition assembly are pivotally coupled to the top panel 36 by cabinet hinges 118, 120, respectively. According to this arrangement, each foldable partition assembly 102, 104 can be folded flat (as shown in FIG. 1 and FIG. 3) and placed in a first position resting across the top load support panel 36, for example for transporting oversized articles. Moreover, the foldable partition assemblies can be erected to an upright standing position, as shown in FIG. 2, for providing lateral support against shifting movement for articles placed on top of the enclosure. In each partition assembly, the divider panels are movable to an unfolded position, as shown in FIG. 2, thereby defining an upright corner frame for opposing shifting movement of a load carried on the underlying load support panel portion.

In the preferred embodiment, the foldable partition assemblies 102, 104 are stabilized in the upright standing position by insertion into set-up locator slots 122, 124, respectively. The locator slots 122, 124 intersect the top panel laterally adjacent the central access opening 60. The locator slots are dimensioned for a close sliding fit with the foldable partition panels 106, 110, whereby each partition panel can be inserted into a locator slot, with one end portion 106A, 110A standing upright within the main storage compartment 58.

Insertion of the partition divider panels into the locator slots is coordinated by a pair of coupling pins 126, 128 which are extended through a pair of guide slots 130, 132, respectively, formed in the partition panels 106, 110. In this arrangement, the cabinet hinges 118, 120 include a first leaf 118A that is attached to the top panel 36, and a relatively movable leaf 118B that is slidably coupled to the partition panel. The coupling pins 126 are attached to the relatively movable leaf portions of each hinge and project through the guide slots, thus permitting sliding movement and maintaining square alignment of the partition panels as they are inserted into the set-up locator slots 122, 124, respectively.

Figure 5:
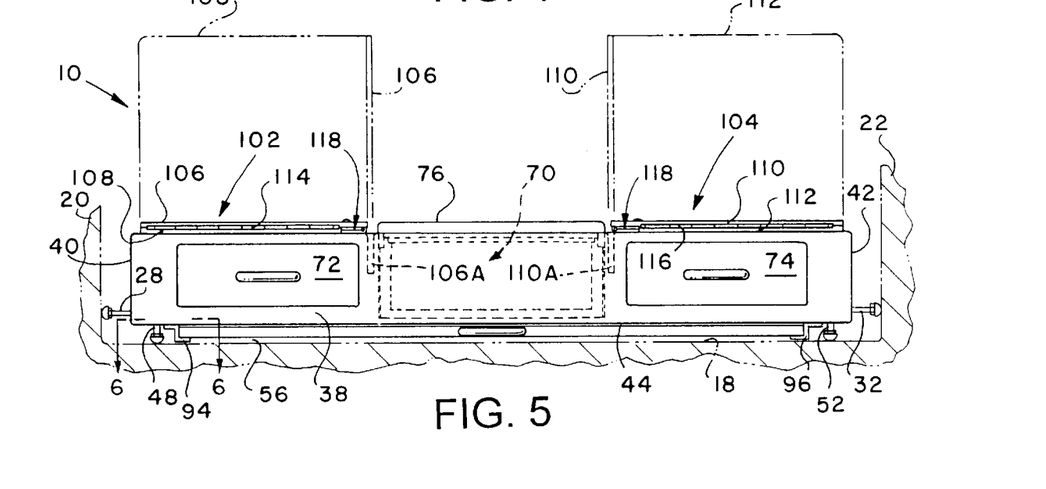
FIG. 5 is a front elevational view thereof.

As shown in FIG. 2 and FIG. 5, the panel end portions 106A and 110A project downwardly into and stand upright within the main storage compartment 58. The forward panels 108, 112 are stabilized in the expanded, unfolded position by a locator pin 134 that is insertable into a retainer bore 136 formed in the top panel 36. In the upright, unfolded position as shown in FIG. 2 and FIG. 5, the foldable partitions define an upright corner frame which, in cooperation with the rear seat 14 and the load deck sidewalls 20, 22 separate and oppose shifting movement of articles carried on the top panel. Moreover, the forward divider panels 108, 112 prevent such articles from spilling out of the rear deck load space when the rear doors are open. Depending upon the spacing of the storage enclosure 10 with respect to the rear seat 14, it may be necessary to trim the side edges of the divider panels to allow them to swing clear of the rear seat, which is angled toward the rear doors.

I claim:

1. A storage enclosure for installation within the rear deck space of a motor vehicle of the type including a rear seat, a rear door access opening, a load deck extending between the rear seat and the access opening, deck sidewalls, and a closure door movable between open and closed positions with respect to the rear door access opening, said storage enclosure comprising:

a top panel, a base panel, a front panel, a rear panel and first and second side panels interconnected to form a storage enclosure, the top panel being intersected by a central access opening between first and second load support panel portions, and the front panel being intersected by first and second front access openings;

a central storage compartment disposed within the storage enclosure in alignment with the central access opening;

a portable storage container removably disposed within the central storage compartment;

first and second front access storage compartments disposed on laterally opposite sides of the central storage compartment in alignment with the first and second front access openings and beneath the first and second load support panel portions, respectively;

first and second pull drawers disposed within the first and second front access storage compartments, respectively, and movably coupled to the storage enclosure for extension and retraction; and, one or more positioning arms movably coupled to at least one of the first and second side panels, the one or more positioning arms being extendable and retractable for engaging at least one of the load deck sidewalls when the storage unit is installed within the rear deck space.

2. A storage enclosure as set forth in claim 1, comprising:

a foldable partition assembly including first and second divider panels coupled together for folding and unfolding movement with respect to each other, with one divider panel being movably coupled to one of the first and second load support panel portions, whereby the foldable partition assembly can be folded flat and placed in a first position resting across the load support panel portion, and can be erected to an upright standing position relative to the load support panel portion, the divider panels being movable to an unfolded position, thereby defining an upright corner frame for opposing shifting movement of a load carried on the load support panel portion.

3. A storage enclosure as set forth in claim 1, wherein the top panel is intersected by a locator slot laterally adjacent the central access opening, and including:

a divider panel movably coupled to one of the first and second load support panel portions adjacent the locator slot, whereby the divider panel can be folded flat upon the load support panel portion and can be erected to an upright standing position with one end of the divider panel being received within the locator slot, thereby opposing shifting movement of a load carried on the load support panel portion.

4. A storage enclosure as set forth in claim 3, wherein the divider panel is intersected by first and second guide slots extending perpendicular to one side edge portion thereof, and comprising:

first and second hinges each including a first leaf and a second leaf, the first leaf of each hinge being attached to the load support panel portion adjacent the locator slot; and, a coupling pin attached to the second leaf of each hinge, the coupling pin being movable through the guide slot as the divider panel is inserted into the locator slot.

5. A storage enclosure as set forth in claim 1, wherein the first and second load support panel portions are intersected by first and second locator slots on laterally opposite sides of the central access opening, and including:

first and second divider panels movably coupled to the first and second load support panel portions, respectively, the first and second divider panels being movable from a first position resting flat upon the first and second load support panel portions, respectively, to an upright standing position in which the divider panels are insertable into and retractable out of the locator slots.

6. A storage enclosure as set forth in claim 1, including:

a closure lid pivotally coupled to the top panel for movement from a retracted position in which the central access opening is covered, to an extended position in which the central access opening is uncovered; and, an auxiliary lid configured for covering engagement with the portable storage container, the auxiliary lid being removably attached to the central storage compartment lid.

7. A storage enclosure as set forth in claim 1, including:

a utility panel slidably coupled to the base panel of the storage enclosure for movement from a storage position in which the utility panel is retracted beneath the base panel of the storage enclosure, to a service position in which the utility panel extends away from the storage enclosure.

8. A storage enclosure as set forth in claim 1, including:

adjustable positioning arms movably coupled to the base panel and engagable with the load deck for elevating and leveling the storage enclosure with respect to the load deck.

9. A storage enclosure as set forth in claim 1, wherein the portable storage container comprises a water-tight assembly of thermally insulated panels, thereby forming a cold-storage compartment.

10. A storage enclosure as set forth in claim 1, including:

first and second handles pivotally coupled to the portable storage container, the first and second handles being movable to a fully retracted position against the portable storage container, and being movable to an upright carry position.

11. A storage enclosure for installation in the load deck space of a motor vehicle of the type including a load deck, opposed left and right deck sidewalls, a rear door access opening between the opposed deck sidewalls, and a closure door movable between open and closed positions relative to the rear door access opening, the storage enclosure comprising:

enclosure panels interconnected to form sidewall boundaries of a storage compartment, the enclosure panels including a top panel intersected by one or more locator slots; and, one or more divider panels slidably coupled to the top panel for rotation from a position resting flat upon the top panel to an upright standing position with one end of each divider panel being received within one of the locator slots.

12. A storage enclosure as set forth in claim 11, the enclosure panels including a base panel, a front panel, a rear panel and first and second side panels, the top panel being intersected by a central access opening between first and second load support panel portions, and the front panel being intersected by first and second front access openings;

a central storage compartment disposed within the storage enclosure in alignment with the central access opening;

a portable storage container removably disposed within the central storage compartment;

first and second front access storage compartments disposed on laterally opposite sides of the central storage compartment in alignment with the first and second front access openings and beneath the first and second load support panel portions, respectively; and, first and second pull drawers disposed within the first and second front access storage compartments, respectively, and movably coupled to the storage enclosure for extension and retraction.

13. A storage enclosure as set forth in claim 11, further including:

one or more positioning arms movably coupled to at least one of the enclosure panels, the one or more positioning arms being extendable and retractable for engaging at least one of the load deck sidewalls when the storage unit is installed in an operative position within the rear deck space.

14. A storage enclosure as set forth in claim 11, the one or more divider panels comprising:

a foldable partition assembly including first and second divider panels coupled together for folding and unfolding movement with respect to each other, with one divider panel being pivotally coupled to one of the first and second load support panel portions, whereby the foldable divider panel assembly can be folded flat upon the load support panel portion and can be erected to an upright standing position relative to the load support panel portion, the divider panels being movable to an unfolded position, thereby defining an upright corner frame for opposing shifting movement of a load carried on the load support panel portion.

15. A storage enclosure as set forth in claim 11, wherein each divider panel is intersected by first and second guide slots extending perpendicular to one side edge portion thereof, and comprising:

first and second hinges each having a first leaf and a second leaf, the first leaf of each hinge being attached to the load support panel portion adjacent the locator slot; and, a coupling pin attached to the second leaf of each hinge, the coupling pin being movable through the guide slot as the divider panel is inserted into the locator slot.

16. A storage enclosure as set forth in claim 11, wherein the top panel is intersected by a central access opening and by first and second locator slots on laterally opposite sides of the central access opening, the one or more divider panels including:

first and second divider panels slidably coupled to the top panel adjacent the first and second locator slots, respectively, the first and second divider panels being movable from a first position resting flat upon the top panel, to an upright standing position in which each divider panel projects through one of the locator slots into the storage compartment.

17. In a motor vehicle of the type including a load deck extending between opposed vertical sidewalls, a rear seat mounted on the load deck, a rear access opening extending between the sidewalls and a rear door mounted for movement between a closed position and an open position controlling access to the rear deck space between the rear seat and the rear access opening, the improvement comprising:

a storage enclosure disposed within the rear deck space, the storage enclosure including a transverse top panel sized to fit between the vertical sidewalls, a depending front panel connected to the top panel thereby defining a forward boundary of a storage compartment, and first and second depending side panels connected to the top panel thereby defining left and right side boundaries of the storage compartment;

one or more positioning arms movably coupled to the first and second side panels, respectively, the one or more positioning arms being extendable into engagement with one or both of the load deck sidewalls when the storage unit is installed within the rear deck space; and, a foldable partition assembly including first and second divider panels movably coupled together along adjoining edges for folding and unfolding movement with respect to each other, with one divider panel being pivotally coupled to the top panel, whereby the foldable partition assembly can be folded flat and placed in a horizontal resting position across the top panel, and can be erected and unfolded to an upright standing position relative to the top panel thereby defining an upright corner frame which, in cooperation with the rear seat and one of the vertical sidewalls, opposes shifting movement of a load carried on the top panel.

18. A storage enclosure for mounting on the load bed of a motor vehicle, the load bed including left and right deck sidewalls, a load deck, a rear access opening formed between the deck sidewalls and a closure door movable between open and closed positions with respect to the rear access opening, and a rear seat mounted on the load deck and a rear deck space confined between the rear seat and the access opening, the storage enclosure comprising:

a top panel and a base panel sized to fit between the right and left deck sidewalls of the motor vehicle, a front panel and first and second side panels connected between the top panel and the base panel, the top panel being intersected by a central access opening between first and second load support panel portions, and the front panel being intersected by first and second front access openings;

one or more positioning arms movably coupled to the first and second side panels, respectively, the one or more positioning arms being extendable into engagement with one or both of the load deck sidewalls when the storage unit is installed in an operative position within the rear deck space;

a central storage compartment disposed within the storage enclosure in alignment with the central access opening;

a portable storage container removably disposed within the central storage compartment;

a closure lid pivotally coupled to the storage enclosure for movement from a closed position in engagement with the top panel in which the central access opening is covered, to an open position extended from the top panel in which the central access opening is uncovered;

first and second pull drawers disposed within the first and second front access storage compartments, respectively, and movably coupled to the storage enclosure for extension and retraction movement into and out of the storage compartments;

a utility panel slidably coupled to the storage enclosure for movement from a storage position in which the utility panel is retracted beneath the base panel, to a service position in which the utility panel is extended away from the storage enclosure; and, a foldable partition assembly including first and second divider panels movably coupled together along adjoining edges for folding and unfolding movement with respect to each other, with one divider panel being pivotally coupled to one of the load support panel portions, whereby the foldable partition assembly can be folded flat and placed in a horizontal resting position on the load support panel portion, and can be erected and unfolded to an upright standing position relative to the load support panel portion thereby defining an upright corner frame which, in cooperation with the rear seat and one of the vertical sidewalls, opposes shifting movement of a load carried on the top panel.

* * * * *